UNITED STATES PATENT OFFICE.

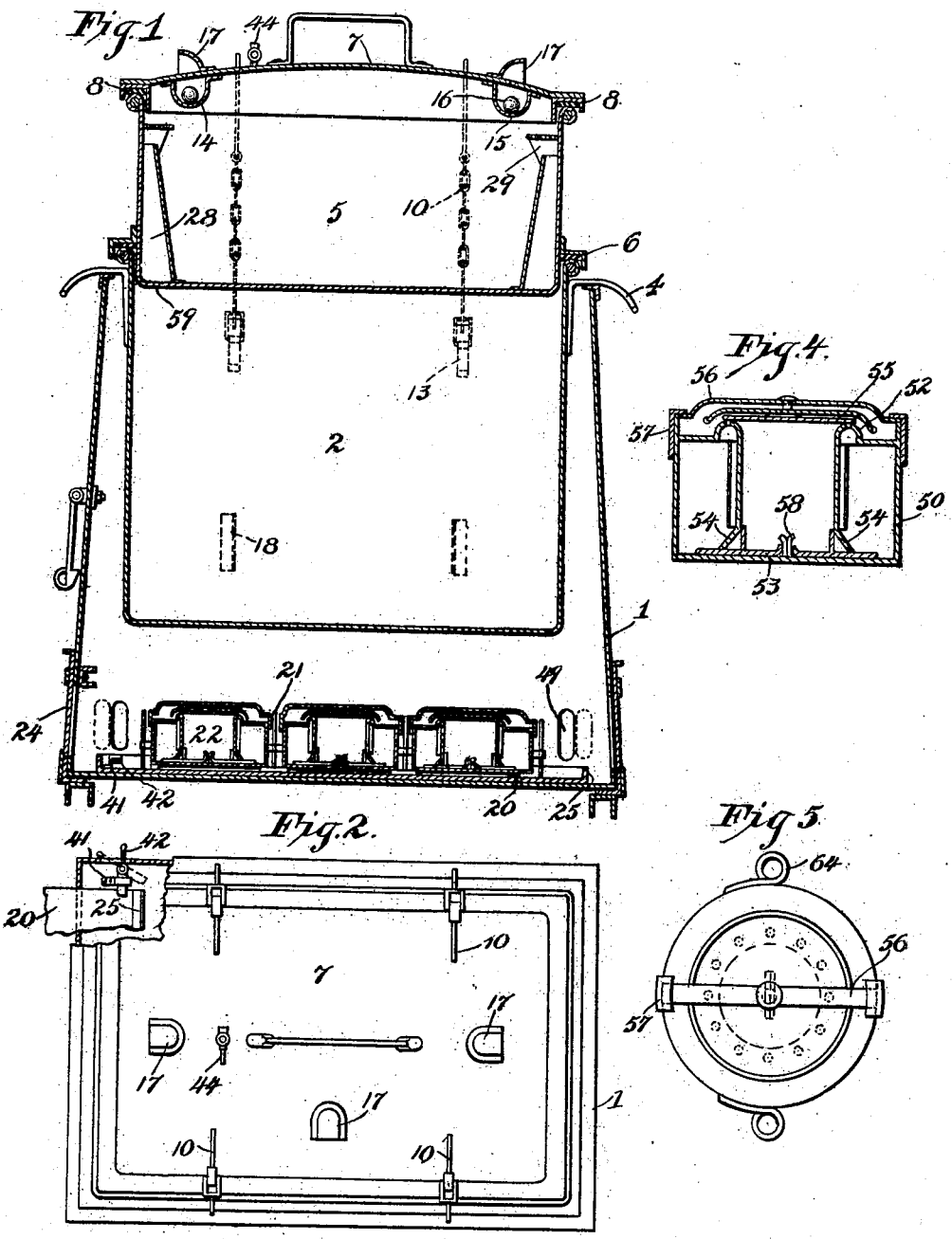

JOST SCHNYDER AND LUDWIG SCHNYDER, OF LUCERNE, SWITZERLAND.

PORTABLE AND TRANSPORTABLE COOKING APPARATUS.

980,842.

Specification of Letters Patent.

Patented Jan. 3, 1911.

Application filed September 18, 1908. Serial No. 453,702.

*To all whom it may concern:*

Be it known that we, JOST SCHNYDER and LUDWIG SCHNYDER, manufacturers, citizens of the Swiss Republic, residing at 54 Moosmattstrasse, Lucerne, Switzerland, have invented a new and useful Portable and Transportable Cooking Apparatus, of which the following is a specification.

This invention relates to a portable cooking apparatus.

An object of the invention is to provide an apparatus in which one or more receptacles containing the articles to be cooked are combined with a device for applying heat to these receptacles.

Another object of the invention is to dispose the receptacles for food with respect to the heating device so that they can be easily removed therefrom.

Another object of the invention is to dispose the receptacles for food with respect to the heating device so that they can be easily surrounded on all sides by the heating gas.

Another object of the invention is to provide means in the receptacles to permit conveyance of the heating gases from one of said receptacles to another without exerting a detrimental influence upon the articles of food.

Another object of the invention is to provide a heating device comprising a plurality of easily movable burners which are disposed so that the member carrying the burner may be withdrawn entirely from the heating device.

With these and other objects in view the invention is described in the following specification under reference to the accompanying drawings and is more explicitly pointed out in and by the appended claim.

In the drawings:—Figure 1 is a longitudinal section through the entire cooking apparatus. Fig. 2 is a plan view of the same partly in section. Fig. 3 is a side elevation of a portion of the apparatus especially adapted for regulating the draft in the heating device, certain parts being broken away for the sake of better illustration. Fig. 4 is a section through one of the burners and Fig. 5 is a plan top view of the same.

Like characters of reference designate similar parts throughout the different figures of the drawings.

The cooking apparatus illustrated by way of example in Fig. 1 comprises an outer casing 1 in which the receptacle containing the food is suspended. This receptacle 2 is near its upper end provided with a plurality of handles 4 with which it engages the upper rim of the outer casing 1. By reference to the drawing it will be noted that the receptacle suspended from the outer casing is not in contact with the interior surface of the same. An interspace is provided between said receptacle for food and said outer casing so that the heating gases may surround said receptacle on the entire circumference. A second receptacle for food or a boiler is placed upon said first named receptacle. This receptacle 5 rests upon the upper rim of the lower receptacle 2 by means of a circumferential flange. A packing 6 may be inserted between said flange and the upper rim of the lower receptacle. A cover 7 serves as a closing means for the upper boiler 5 said cover resting upon the upper rim of the boiler and a packing ring 8 is inserted between the rim and said closing means. For the purpose of transmitting the vapors from the lower receptacle to the upper one a plurality of apertures 59 are provided in the bottom of the upper receptacle and from these apertures channels 28 extend upwardly in the upper receptacle 5, said channels being partly closed by means of hoods or sieves 29 at the upper end of the same. For the purpose of allowing the steam contained in the upper receptacle to escape when the pressure of the same exceeds a certain limit, a plurality of pockets 14 are fastened to the cover, said pockets being provided with apertures 15 in their bottoms. A plurality of apertures are provided in the cover itself registering with the apertures 15 and globe valves 16 are disposed in said pockets 14 which may be lifted by the pressure of the steam off their seats so that the steam may escape through the apertures in the cover. The steam escaping through these apertures is directed laterally by means of a plurality of ears 17 disposed on the top of the cover and adjacent to the apertures for the escape of the steam. A plurality of tension members, chains, cables, rods or such like indicated by the numeral 10 serve for maintaining the cover in closing position upon the upper receptacle. One end of the tension members 10 is detachably connected at 13 with a portion of the outer casing. A plurality of spacing members 18 are provided in the interior of the outer casing and serve likewise to maintain the inner receptacle in its position while the cooking apparatus is transported. The cover 7 is also provided with a blow-off cock 44.

A plate 20 superposed on the bottom of the casing carries a plurality of upright rods 21 and may be displaced slidingly with respect to the casing. A rear flange 25 extending upwardly from the plate 20 is adapted to engage a pivotally mounted lever 42 disposed near the front wall of the casing said lever being mounted underneath a guiding strip 41 on the casing. If the lever 42 is in the position shown in full lines in Fig. 2 the flange 25 will engage said lever when the plate 20 is partly removed from the casing and this lever will then prevent a complete withdrawal of said plate from the casing. To withdraw the plate entirely from the casing it is only necessary to swing the lever 42 into the position shown in dotted lines in Fig. 2.

The outer casing is provided near its bottom part with a plurality of air supply holes 49 and the draft through said holes may be regulated by means of a slide 27 guided in rails 60 and 61 on the outside of the casing. This slide 27 is provided with a plurality of holes adapted to register with apertures 49 when said slide is in a certain position. A lever 63 bifurcated at its lower end and in engagement with a pin 40 on said slide serves for displacing the same and for maintaining it in any arbitrary position.

The burner comprises a receptacle 50 provided with a center tube extending almost to the bottom of the same. This center tube is at its upper end provided with a collar 52 having a plurality of apertures and at its lower end it is bent outwardly as indicated at 54. An asbestos disk 53 rests on the bottom of the burner and the wick 58 extends upwardly through the center of said disk. A cover 55 is held on the burner itself by means of a strap 56 entering into small pieces of angle-iron, fastened to the burner on opposite points for facilitating the transport of the burner while the same is removed from the casing. The burner is also provided with two ears 64 adapted to engage rods 21 on the plate 20; the rods 21 serve for positioning the burners on the plate and for preventing their displacement during the transport of the casing.

I claim:—

In a cooking apparatus of the class described the combination of a casing provided with a bottom, a plate slidingly superposed on said bottom, a boiler disposed in said casing, a plurality of heating devices removably secured to the bottom plate of said casing, a lever pivotally mounted on said casing, said bottom plate being provided with a flange to engage said lever, when in a partly retracted position.

In testimony whereof we affix out signatures in presence of two witnesses.

JOST SCHNYDER.
LUDWIG SCHNYDER.

Witnesses:
GEORG ROTH,
JOSEPH SIMON.